United States Patent [19]
Wick et al.

[11] 3,733,989
[45] May 22, 1973

[54] AUTOMATIC FOCUSING ARRANGEMENT

[75] Inventors: Richard Wick; Alfred Winkler; Bernhard Von Fischern, all of Munich, Germany

[73] Assignee: Agfa-Gevaert Aktiengesellschaft, Leverkusen, Germany

[22] Filed: Dec. 23, 1971

[21] Appl. No.: 211,373

[30] Foreign Application Priority Data

Dec. 24, 1970   Germany.................P 20 63 705.2

[52] U.S. Cl............................95/44 C, 95/45, 250/209
[51] Int. Cl.................................................G03b 3/02
[58] Field of Search.....................95/44 C; 250/208, 250/209, 220

[56] References Cited

UNITED STATES PATENTS

| 3,367,254 | 2/1968 | Townsley | 95/44 C |
| 3,567,945 | 3/1971 | Appleby | 250/209 |
| 2,944,154 | 7/1960 | Bosch | 250/209 |
| 3,270,647 | 9/1966 | Jakob et al | 95/44 C |
| 3,623,811 | 11/1971 | Lederer | 95/44 C |

Primary Examiner—Samuel S. Matthews
Assistant Examiner—E. M. Bero
Attorney—Michael S. Striker

[57] ABSTRACT

A split image of a vertical edge of an object is formed by a standard range finder, the two half images coinciding in a vertical direction when the objective lens is properly focused. An oscillating mirror reflects light along a horizontal line including the top half image onto a first photocell and light along a horizontal line including the bottom half image onto a second photocell. The photocells thus emit a scanning signal when the respective half images are reflected thereon. A first and a second threshold circuit is responsive to these scanning signals and the outputs of the first and second threshold circuit are applied each to one input of and AND-gate, the output of which causes the motor positioning the objective lens to stop upon simultaneous receipt of the scanning signals.

13 Claims, 13 Drawing Figures

PATENTED MAY 22 1973

INVENTORS
DIR. DR. RICHARD WICK
BY  O.I. ALFRED WINKLER
BERNHARD v. FISCHERN

3,733,989

AUTOMATIC FOCUSING ARRANGEMENT

BACKGROUND OF THE INVENTION

The present invention relates to a photographic camera, and more specifically to an automatic focusing arrangement for such camera. Even more particularly it relates to the type of automatic focusing arrangement wherein the objective lens is moved between a first and second end position, namely a close- and far-focusing position at least in part under control of an electronic circuit arrangement whose input is derived from a light-sensitive element. Such an electronic circuit may for example cause the motor moving the lens to be de-energized when the lens has been moved to the proper position wherein the object to be photographed is properly focused.

SUMMARY OF THE INVENTION

It is an object of the present invention to furnish an automatic focusing arrangement of the above-described type in which the movement of the lens is stopped in a simple and reliable manner whenever the object to be photographed is in sharp focus on the film plane.

The present invention comprise lens means and moving said lens means between a first and second end position. It further comprises optical means which create a split image of a determined portion of the object to be photographed, said split image comprising a first and second half image. The two half images are aligned when the object to be photographed is in sharp focus and are misaligned, that is displaced from one another in a first direction, when the object is not in sharp focus. Scanning means scan in said first direction along a first and second scanning path which, respectively, include said first and second half images. Said first and second scanning means respectively furnish first and second scanning signals when scanning said first and second half image. Finally, control means are interconnected between said scanning means and said moving means for stopping said moving means upon substantially simultaneous receipt of said first and second scanning signal.

More specifically, a known type of optical system creating a split image is used in conjunction with a first diaphragm. An oscillating mirror scans the section of the diaphragm having the first and second half image. Light from the first half image is reflected onto a first photosensitive element, while light from the second half image is reflected onto a second photosensitive element. The photosensitive elements are each connected to the input of a control circuit. The first and second control circuits each comprise pulse-forming stages, the output of each of these pulse-forming stages being applied to an output stage which is an AND-circuit. The output from the AND-circuit causes a de-energization of the servomotor moving the lens.

More specifically, when the lens is in a position wherein the object is not in proper focus, the first and second half image are displaced from each other in a first direction, for example horizontally. The first diaphragm has a first and second horizontal slit, respectively encompassing a portion of the first and second half image. The oscillating mirror reflects consecutive horizontal portions of the first and second horizontal slit consecutively upon the first and second photosensitive element, respectively. When the scanning mirror reflects the first or second half image, a corresponding output from the photosensitive element results. The photosensitive elements will thus furnish output signals simultaneously only when the two half images are aligned, that is when the lens is correctly positioned for focusing the objects onto the film plane. Simultaneous generation of a signal in the photosensitive element will cause a simultaneous input to the two inputs of the AND-gate mentioned above, thereby causing an output of said AND-gate which in turn stops the motor moving the lens.

In a further embodiment of the present invention, the pulse-forming stages associated with each of the light-sensitive elements comprise amplifiers, equalizers, differentiating circuits and rectifiers. In a particularly embodiment of the present invention the equalizing elements are Schmitt triggers.

The rectifiers associated with each of the pulse-forming stages are connected to the first and second inputs of the above-mentioned AND-gate, each through an emitter-follower stage.

Each of said emitter-follower stages may, in a preferred embodiment, be conductive in the presence of scanning signals signifying a half image and non-conductive in the presence of scanning signals resulting from the absence of a half image.

The output of the above-mentioned AND-gate may be connected to the gate of a thyristor, whose anode-cathode circuit is connected to the base of a switching transistor. The servomotor moving the lens may then be connected into the collector-emitter circuit of the switching transistor.

The means oscillating the scanning mirror control said mirror in such a manner that the amplitude of oscillation is restricted to the length of the slit in the diaphragm.

In a further preferred embodiment of the present invention the lens may be moved into an end position, for example the position for photographing a distant object, after the exposure has been made. Specifically, the movement of the objective may be linked to the film transport.

Photovoltaic cells may be used as the photosensitive elements in a preferred embodiment of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
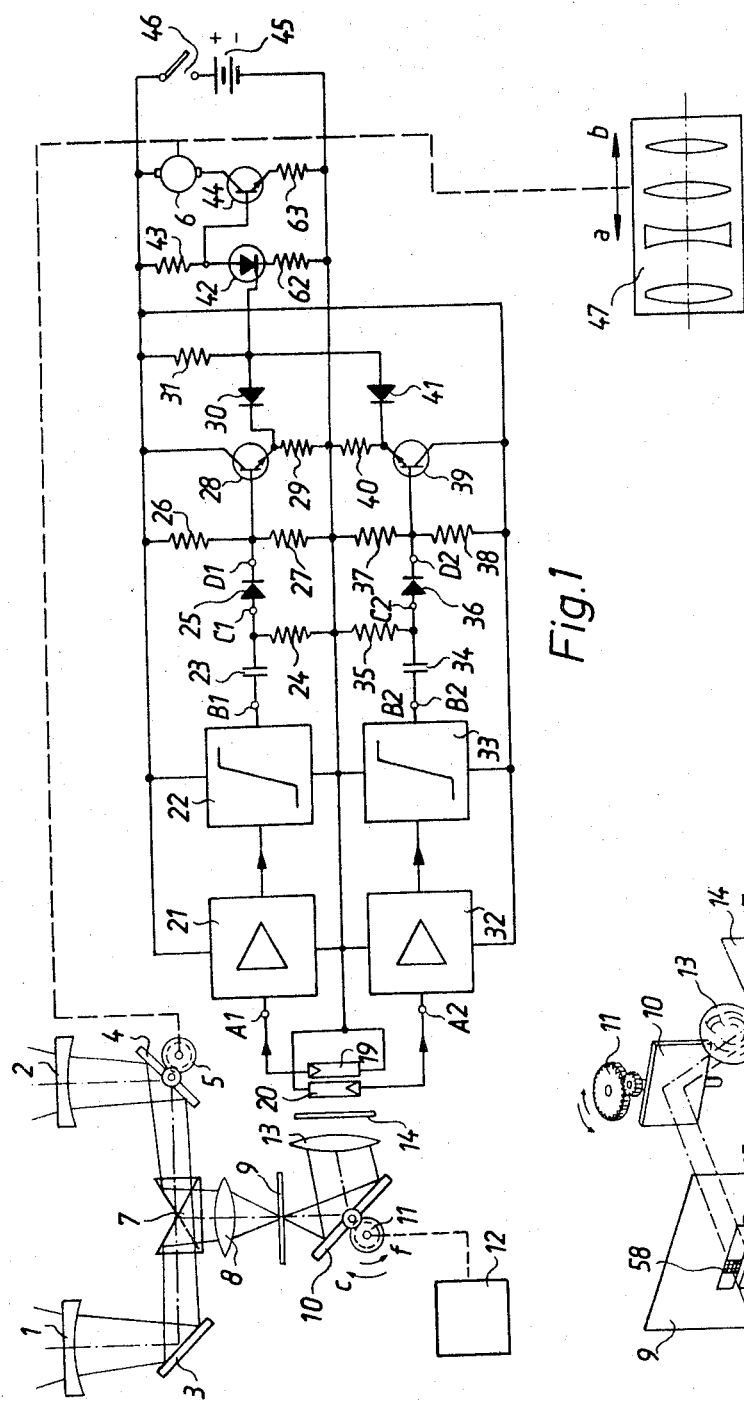
FIG. 1 is a schematic diagram of a focusing arrangement of the present invention.

A preferred embodiment of the present invention will now be described with reference to the drawing.

As shown in FIG. 1, the optical system for furnishing a split image comprises a lens 1 and 2, a stationary mirror 3, a mirror 4 mounted for oscillation around an axis and driven by a gear 5 which in turn is coupled to a servomotor 6. The optical system further comprises a split image prism 7, a convex lens 8 and a diaphragm 9.

An oscillating mirror 10 is arranged behind the diaphragm 9. This oscillating mirror is oscillated by a gear 11 which in turn is driven by a drive system 12 to be described below. A further convex lens has reference numeral 13, and a second diaphragm is designated by reference numeral 14.

Figure 1A:
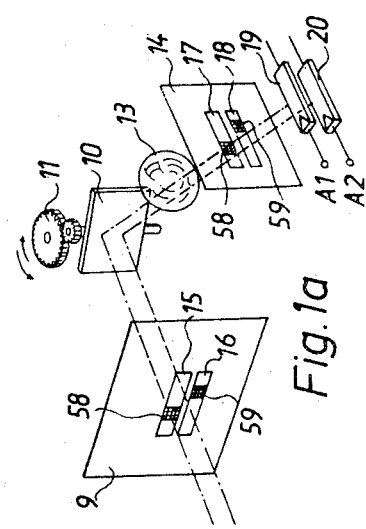
FIG. 1a is a perspective diagram showing the optical split image system.

As shown in FIG. 1a, diaphragm 9 has two horizontal slits 15, 16 arranged one on top of the other. Diaphragm 14 has similar slits numbered 17 and 18. A photoelement 19 is arranged at the height of slit 17, while a photoelement 20 is arranged at the height of slit 18 of diaphragm 14.

Referring again to FIG. 1, the photoelement 19 is connected to the input A1 of a control circuit whose output controls the energization of servomotor 6. Specifically, terminal A1 designates the input of an amplifier 21 whose output is connected to the input of a Schmitt trigger 22. The output of Schmitt trigger 22, labelled B1, is connected to a differentiating circuit comprising a capacitor 23 connected to a resistance 24. The common terminal of capacitor 23 and resistance 24 is labelled C1. The output of the differentiating means, namely the signal at terminal C1, is applied through a rectifier D1 poled to permit the passage of positive pulses, to the base of a transistor 28. The terminal at the base of transistor 28 is labelled E1. It is also the tap of a voltage divider connected from the positive battery side to the negative or ground side and comprising a resistance series-connected to a resistance 27. Transistor 28 is connected as an emitter-follower and has an emitter resistance 29. The values of resistors 26 and 27 are so chosen that transistor 28 is cut off in the absence of a signal at terminal D1.

Similarly, photoelement 20 is connected to the input A2 of an amplifier 32 whose output is connected to a Schmitt trigger 33. The output of the Schmitt trigger appears at a terminal B3 and is differentiated by a capacitor 34 and a resistance 35. The common point of resistance 35 and capacitor 34 is labelled C2 and is connected to the anode of a diode 36 whose cathode is connected to the base of a transistor 39. Similarly, to transistor 28, transistor 39 is kept at a cut-off condition in the absence of a signal at terminal D2 by means of a voltage divider comprising a resistance 37 series-connected to a resistance 38. Specifically, the base of transistor 39 is connected to the voltage divider tap of this voltage divider, which also constitutes terminal D2. Again, transistor 39 has an emitter resistance 40. The emitter of transistor 28 is connected to the cathode of a diode 30 whose anode is connected to a resistance 31. The anode of diode 30 is also connected to the anode of a diode 41 whose cathode is connected to the emitter of transistor 39. The free terminal of resistor 31 is connected to the positive supply line. The anodes of diodes 30 and 41 are connected to the control gate of a thyristor 42 whose anode is connected to the positive supply line via a resistance 43 and to the negative supply line via a resistance 62. The anode of thyristor 42 is further connected to the base of a switching transistor 44 into whose emitter-collector circuit are connected servomotor 6 and a resistance 63. The overall circuit is energized by a battery 45 which is connected into the circuit upon closure of a switch 46. Servomotor 6 drives the lens system 47 in a direction indicated by a and b.

Figure 1B:
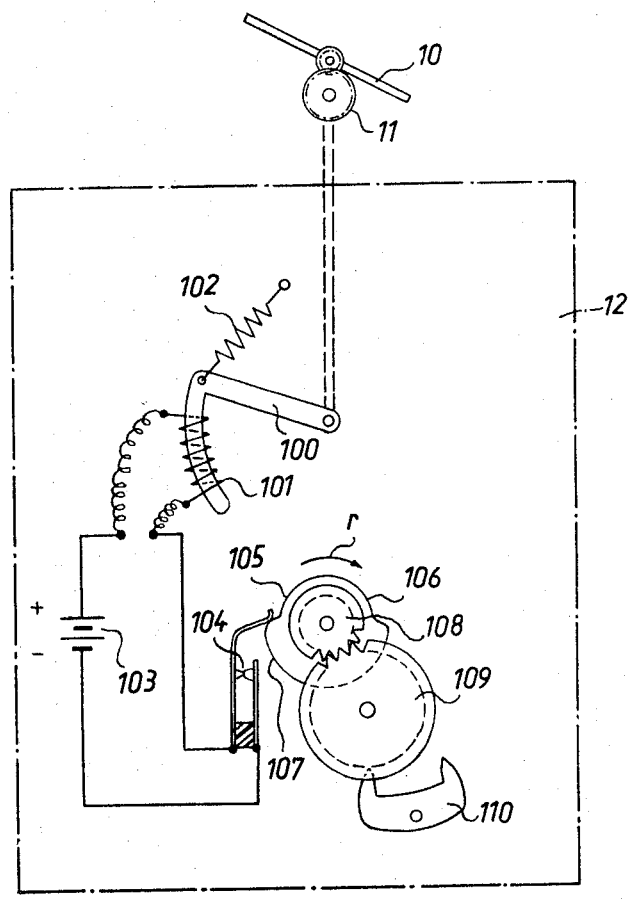
FIG. 1b is a diagram showing the drive for the scanning mirror.

FIG. 1b shows the mechanism for oscillating mirror 10. Specifically it comprises an escapement-type mechanism having a latch 110 and gears 108 and 109. A cam 106 operates a contact 104 which periodically connects a voltage source 103 to a magnetic coil 101. Coil 101 is part of a relay whose armature 100 moves back and forth in synchronism with the energization and de-energization of coil 101, that is in synchronism with the closing of contact 104. When coil 101 is de-energized, a spring 102 returns the armature to the original position. The motion of the armature is coupled to mirror 10 through gear 11 which causes oscillation of said mirror.

Figure 2A:
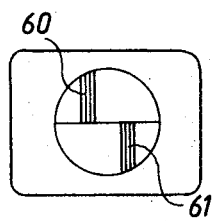
FIG. 2a shows the ground glass image for the optical system of FIG. 1.
Figure 2:
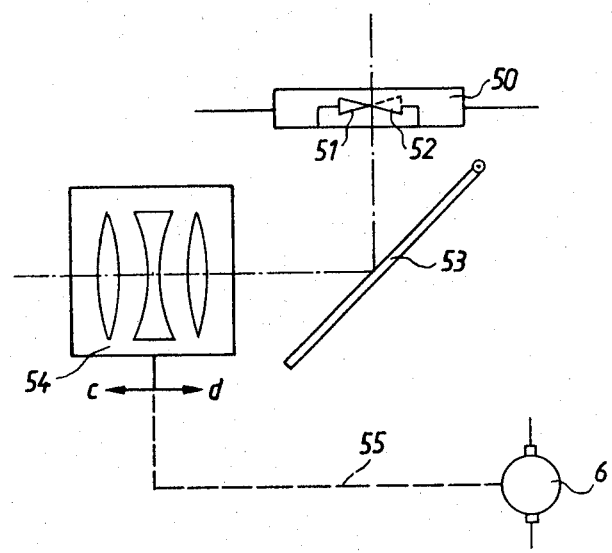
FIG. 2 shows an alternate optical system for generating a split image.

An alternate optical system for furnishing a split image is shown in FIG. 2. The optical system shown in FIG. 2 is particularly useful in a reflex camera. Reference numeral 50 denotes a ground glass plate having two separate prism halves 51 and 52. 53 denotes a rotatively mounted mirror, while reference numeral 54 denotes the lens which may be moved in direction c or direction d. Mechanical coupling 55 connects the lens to servomotor 6. When lens 54 is incorrectly positioned for sharp focusing of the object, a split image (60,61) results on ground glass plate 50. This is similar to the split image created by an incorrect positioning of lens 47 and mirror 4 in FIG. 1. The latter resulted in the split image comprising half images 58 and 59.

Figures 3A, 3B, 4A, 4B, 5A, 5B, 6A, 6B:
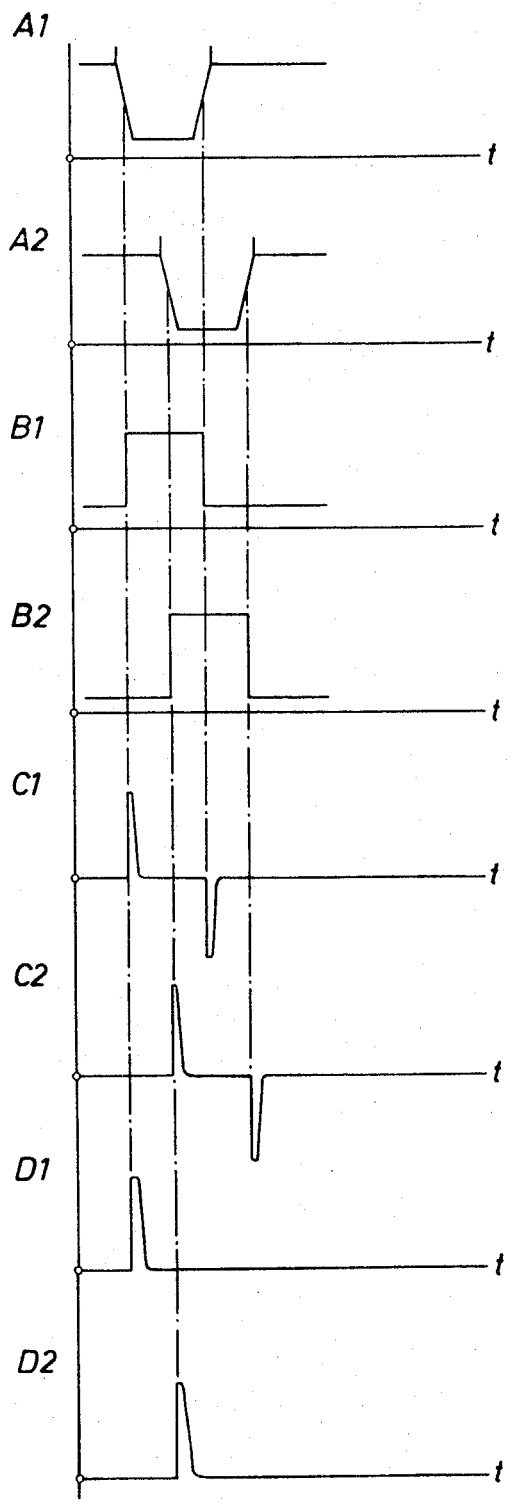
FIGS. 3a, 3b, 4a, 4b, 5a, 5b, 6a, and 6b are timing diagrams showing the waveforms at various points in the control circuit.

If now the drive system 12 is energized either when the shutter is cocked or during operation of the film transport, then gear 11 starts to oscillate mirror 10 in direction e and f. The mirror thus scans slits 15 and 16 of the optical system. When the mirror reflects a half image 58 or 59, the output of photosensitive elements 19 and 20 change respectively. FIG. 3a and 3b show, respectively, the output of photoelements 19 and 20 during the scanning of slits 15 and 16. FIGS. 4a and 4b show the outputs at the corresponding Schmitt triggers 22 and 33 which result from the variation of photosensitive element outputs shown in FIGS. 3a and 3b, respectively.

The rectangular pulses shown in FIGS. 4a and 4b are differentiated, resulting, respectively, in the signals shown in FIGS. 5a and 5b.

The negative signals are then eliminated by rectifiers D1 and D2 respectively, resulting in the signals shown in FIGS. 6a and 6b. These are the signals appearing at terminals D1 and D2, respectively.

It will be noted that the pulse at terminal D1 appears prior to the pulse at terminal D2. A positive pulse appearing at terminal D1 causes transistor 28 to become highly conductive, in turn causing its emitter to be at substantially the full battery voltage. At this point diode 30 blocks, so that this positive pulse cannot be further transmitted. At the time at which the positive pulse appears at terminal D1, as stated above, no pulse appears at terminal D2, thus causing transistor 39 to remain blocked. Thus, the cathode of rectifier 41 is connected to the negative line via resistance 40. Rectifier 41 is thus conductive and the gate of thyristor 42 is connected to what is substantially the negative supply potential. Thus, thyristor 42 remains blocked. Since thyristor 42 is blocked, the base of transistor 44 is substantially at the potential of the positive supply line, causing transistor 44 to be conductive, thereby energizing motor 6. This causes the motor to move lens 47 from its original position, namely one end position towards the second end position. The first and second end positions may respectively be the positions for properly focussing a very distant and a very close object. Simultaneously, the movement of motor 6 causes a movement of mirror 4. The first and second half image 58 and 59 thus commence to move closer to one another. Thus, the time difference between the two pulses shown in FIGS. 6a and 6b decreases.

The pulses at terminals D1 and D2 will of course finally coincide, thereby causing simultaneous blocking of diodes 30 and 41. The gate of thyristor 42 will then receive a positive voltage via resistance 31, causing thyristor 42 to fire. Firing of thyristor 42 in turn causes transistor 44 to block, thereby de-energizing motor 6 and causing the lens 47 and mirror 4 to stop moving. At this point a sharp image of the object to be photographed is created in the film plane. The above description of course indicates that diodes 30 and 41 in combination with resistance 31 constitute an AND-gate. It should further be noted that the criterion for stopping the motor is developed strictly from a change in the output of photosensitive elements 19 and 20, which are in a preferred embodiment of the present invention, photovoltaic cells. The swing of mirror 10 must thus be controlled to avoid the scanning of the edges of slits 15 and 16 (the vertical edges) since this would give a false indication of split image coincidence. Slits 17 and 18 must be short relative to slits 15 and 16, or photovoltaic cells 19 and 20 must cover a short horizontal distance only, since these cells will of course respond substantially equally to light falling on any portion thereof.

Operation of the camera release button will then cause opening of switch 46 and may also be used to disconnect the drive 12 from mirror 10. It is of course also possible to provide a separate switch or key for operating switch 46 and, simultaneously therewith energizing drive system 12. Release of such a separate key or switch may then cause contact 46 to open and drive system 12 to be disconnected.

It is further possible to disconnect the automatic focusing arrangement including mirror oscillating means 12 whenever the lens reaches the second end position. This would improve the operation in the unlikely event that automatic focusing did not take place.

While the invention has been illustrated and described as embodied in specific scanning, optical and control systems, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a photographic camera, an automatic focusing arrangement, comprising, in combination, lens means; moving means moving said lens means along a predetermined path between a first and second end position; optical means creating a split image of a determined portion of an object to be photographed, said split image comprising a first and second half image displaced from each other along a first axis when said lens means is incorrectly positioned for focusing said object and coinciding when said lens means is correctly positioned for focusing said object; oscillating mirror means mounted to reflect said first and second half image, respectively, back and forth along a first and second predetermined path parallel to said predetermined axis; first and second photosensitive means respectively mounted in corresponding positions along said first and second predetermined path for receiving said so-reflected first and second half images respectively and furnishing a first and second scanning signal, respectively, in response thereto; and AND-gate means having a first and second input respectively connected to said first and second photosensitive means and an AND-gate output connected to said moving means, for deenergizing said moving means in response to simultaneous receipt of said first and second scanning signals, whereby said moving means are stopped upon alignment of said first and second half image.

2. An arrangement as set forth in claim 1, further comprising first diaphragm means positioned between said oscillating mirror means and said first and second photosensitive means, said first diaphragm means having a first and second slit extending parallel to said predetermined axis said slit allowing transmittal of a selected portion of said reflected first and second half image to said first and second photosensitive means, respectively.

3. An arrangement as set forth in claim 2, further comprising second diaphragm means arranged between said optical means and said oscillating mirror means, said second diaphragm means having a first horizontal slit, and a second horizontal slit arranged below said first horizontal slit.

4. An arrangement as set forth in claim 3, wherein said oscillating mirror means have an angle of oscillation smaller than the angle of oscillation required for transmitting light along the full length of said first and second horizontal strip onto said first and second photosensitive means.

5. An arrangement as set forth in claim 2, wherein said first diaphragm means have a first horizontal slit, and a second horizontal slit arranged below said first horizontal slit.

6. An arrangement as set forth in claim 1, wherein said moving means comprise servomotor means; further comprising switching circuit means connected to said AND-gate output for deenergizing said servomotor means in response to substantially simultaneous receipt of said first and second scanning signals.

7. An arrangement as set forth in claim 6, further comprising first and second pulse-forming means respectively interconnected between said first photosensitive means and said first AND-gate input, and said second photosensitive means and said second AND-gate input.

8. An arrangement as set forth in claim 7, wherein said first and second pulse-forming means each comprise amplifier means, differentiating means, and rectifier means.

9. An arrangement as set forth in claim 8, further comprising first and second Schmitt trigger means interconnected between said amplifier means and said differentiation means of said first and second pulse-forming means respectively.

10. An arrangement as set forth in claim 9, wherein said first and second pulse-forming means respectively comprise first and second emitter-follower means connected between said rectifier means and said first and second AND-gate input respectively.

11. An arrangement as set forth in claim 10, wherein said first and second emitter-follower means comprise a first and second transistor respectively; and further comprising first and second biasing means respectively biasing said first and second transistor means to cut-off in the absence of said first and second scanning signal respectively; and wherein said first and second scanning signal respectively drive said first and second transistor to a conductive condition.

12. An arrangement as set forth in claim 11, wherein said switching circuit means comprise thyristor means having a gate connected to said AND-gate output; and switching transistor means having a base connected to the anode of said thyristor means and an emitter-collector circuit connected to said servomotor.

13. An arrangement as set forth in claim 1, wherein said photosensitive means comprise photovoltaic cells.

* * * * *